(12) United States Patent
Gorter et al.

(10) Patent No.: US 12,407,724 B2
(45) Date of Patent: Sep. 2, 2025

(54) ANALYZING MESSAGES FOR MALICIOUS CONTENT USING A CLOUD COMPUTING SYSTEM

(71) Applicant: Bank of America Corporation, Charlotte, NC (US)

(72) Inventors: Charlene Moss Gorter, Concord, NC (US); Kyle Andrew Mayers, Charlotte, NC (US); Sanjay Arjun Lohar, Charlotte, NC (US); James Siekman, Charlotte, NC (US); Connor Thomas McCormick, Westminster, CO (US)

(73) Assignee: Bank of America Corporation, Charlotte, NC (US)

( * ) Notice: Subject to any disclaimer, the term of this patent is extended or adjusted under 35 U.S.C. 154(b) by 342 days.

(21) Appl. No.: 18/164,056

(22) Filed: Feb. 3, 2023

(65) Prior Publication Data
US 2024/0267410 A1 Aug. 8, 2024

(51) Int. Cl.
H04L 9/40 (2022.01)
(52) U.S. Cl.
CPC ...... H04L 63/1483 (2013.01); H04L 63/1425 (2013.01)
(58) Field of Classification Search
None
See application file for complete search history.

(56) References Cited

U.S. PATENT DOCUMENTS

| | | | |
|---|---|---|---|
| 8,255,572 B1 | 8/2012 | Coomer | |
| 8,510,829 B2 | 8/2013 | Mohandas et al. | |
| 8,549,642 B2 | 10/2013 | Lee | |
| 8,805,996 B1 | 8/2014 | Gauvin | |
| 9,104,867 B1 | 8/2015 | Thioux et al. | |
| 9,223,980 B1 | 12/2015 | Bao | |
| 9,241,009 B1 | 1/2016 | Starink et al. | |
| 9,356,948 B2 | 5/2016 | Higbee et al. | |
| 9,565,202 B1 | 2/2017 | Kindlund et al. | |
| 9,876,753 B1 | 1/2018 | Hawthorn | |
| 9,888,016 B1 | 2/2018 | Amin et al. | |
| 10,025,927 B1 | 7/2018 | Khalid et al. | |
| 10,027,690 B2 * | 7/2018 | Aziz | G06F 21/56 |
| 10,192,052 B1 | 1/2019 | Singh et al. | |
| 10,505,956 B1 | 12/2019 | Pidathala et al. | |
| 10,523,609 B1 | 12/2019 | Subramanian | |
| 10,616,272 B2 | 4/2020 | Chambers et al. | |
| 11,483,343 B2 | 10/2022 | Kohavi | |
| 12,143,418 B2 * | 11/2024 | Gopathy | H04L 63/0281 |

(Continued)

Primary Examiner — Jeffrey R Swearingen

(57) ABSTRACT

A method for analyzing messages for malicious content is provided. The method includes intercepting a message comprising a quick response (QR) code or a uniform resource locator (URL). The QR code corresponds to the URL. A status of the message is determined by determining a source of the message. The source of the message is compared to known malicious sources. In response to the source of the message not matching any of the known malicious sources, the source of the message is compared to known safe sources. In response to the source of the message not matching any of the known safe sources, the URL is compared to known malicious URLs. In response to the URL matching a respective one of the known malicious URLs, the status of the message is determined as malicious. The message is released to be displayed along with the status.

11 Claims, 4 Drawing Sheets

(56) References Cited

U.S. PATENT DOCUMENTS

| | | | |
|---|---|---|---|
| 2016/0366100 A1 | 12/2016 | Liu et al. | |
| 2021/0097168 A1* | 4/2021 | Patel | G06F 21/554 |
| 2022/0070216 A1 | 3/2022 | Kohavi | |
| 2024/0338447 A1* | 10/2024 | Burns | G06F 21/53 |

* cited by examiner

ANALYZING MESSAGES FOR MALICIOUS CONTENT USING A CLOUD COMPUTING SYSTEM

TECHNICAL FIELD

The present disclosure relates generally to detecting malicious content, and more specifically to a system and method for analyzing messages for malicious content using a cloud computing system.

BACKGROUND

Malicious actors devise various methods to compromise security of computer systems. For example, malicious actors may send to a user a message with a uniform resource locator (URL), which points to a malicious content, such as a malicious file or a malicious webpage. By accessing malicious files or malicious webpages, malicious users may gain unauthorized access to a device of the user and to computer systems that the user has access to.

SUMMARY

The system described in the present disclosure provides several practical applications and technical advantages that overcome the current technical problems with analyzing messages for malicious content.

In general, a client application of a user device may intercept a message and send it to a cloud computing system for analysis. The cloud computing system may be configured to analyze the message received by the user device and determine a status of the message as safe, suspicious, or malicious. The message may comprise a uniform resource locator (URL) that points to a content (e.g., a file or a webpage), which may be safe, suspicious, or malicious. The cloud computing system may determine the status of the message by comparing the URL with known safe and malicious URLs, comparing a source of the message to known safe and malicious sources, and/or analyzing the URL and the content identified by the URL for malicious content and/or spelling errors. After determining the status of the message, the cloud computing system sends the status to the client application of the user device. The client application then releases the message to be displayed by the user device along with this status. The cloud computing system may receive feedback from the user and may update the known safe and malicious URLs and the known safe and malicious sources based on the feedback.

By analyzing a message for the malicious content and providing a user with a status of the message, the user will be alerted to potential dangers of the message and may decide to respond to the message based on the status. For example, if the status of the message is malicious, the user may decide not to access content identified by the URL and malicious users will be denied access to the user device. Accordingly, the security of the user device, and the computing system that the user has access to, is improved. Furthermore, by updating the known safe and malicious URLs and the known safe and malicious sources based on user's feedback most up-to-date information is stored in the cloud computing system, which further improves the security of the user device.

Accordingly, the following disclosure is particularly integrated into practical applications of: (1) identifying malicious content in messages received by a user device; (2) updating the cloud computing system, such that the cloud computing system stores most up-to-date information that is used for analyzing the messages; (3) improving security of the user device; and (4) improving security of a computing system that the user device has authorized access to.

In one embodiment, a system includes a user device and the cloud computing system communicatively coupled to the user device. The user device includes a first memory and a first processor communicatively coupled to the first memory. The first memory is configured to store a client application. The first processor, when executing the client application, is configured to intercept a message comprising a quick response (QR) code or a uniform resource locator (URL), wherein the QR code corresponds to the URL, send the message is sent to a cloud computing system, receive a status of the message from the cloud computing system, and release the message to be displayed along with the status. The cloud computing system includes a second memory and a second processor communicatively coupled to the second memory. The second memory is configured to store known safe URLs, known malicious URLs, known safe sources, known malicious sources, known malicious codes, and hashes of known malicious files. The second processor is configured to receive the message from the user device and determine the status of the message. Determining the status of the message includes determining a source of the message. The source of the message is compares to the known malicious sources. In response to the source of the message not matching any of the known malicious sources, the source of the message is compared to the known safe sources. In response to the source of the message not matching any of the known safe sources, the URL is compared to the known malicious URLs. In response to the URL matching a respective one of the known malicious URLs, the status of the message is determined as malicious. The status of the message is sent to the user device.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

As described above, previous technologies fail to provide effective solutions for analyzing messages for malicious content. Embodiments of the present disclosure and their advantages may be understood by referring to FIGS. 1, 2A, 2B, and 2C. FIGS. 1, 2A, 2B, and 2C are used to describe a system and method for analyzing messages for malicious content.

System Overview

Figure 1:
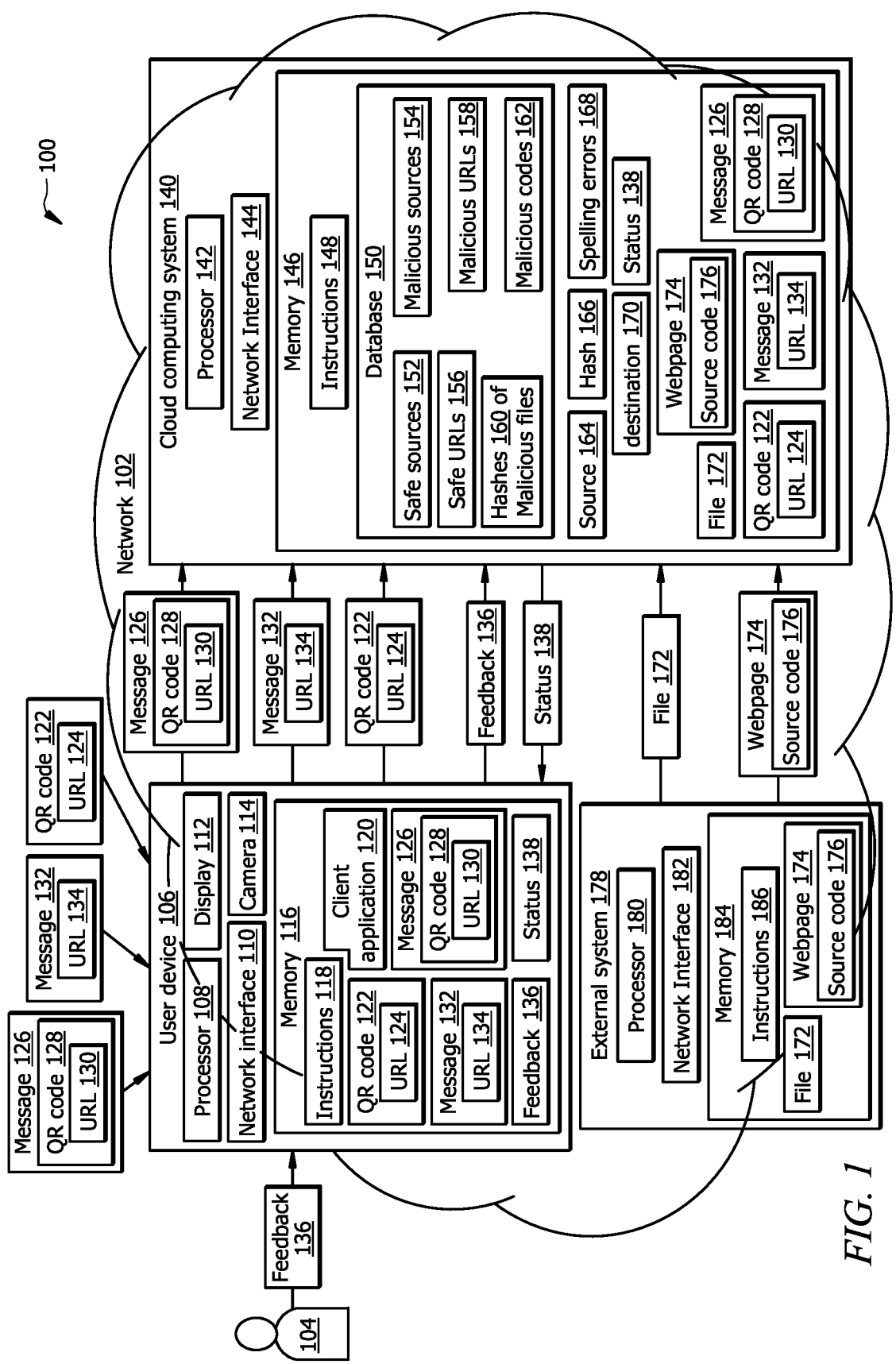
FIG. 1 illustrates an embodiment of a system configured to analyze messages for malicious content.

FIG. 1 illustrates an embodiment of a system 100 that is generally configured analyze messages for malicious content. In certain embodiments, the system 100 comprises a user device 106 operably coupled to a cloud computing system 140 via a network 102. The system 100 may be further operably coupled to an external system 178 via the network 102. Network 102 enables the communication between the components of the system 100. In other embodiments, system 100 may not have all the components listed and/or may have other elements instead of, or in addition to, those listed above.

In general, a client application 120 of a user device 106 may intercept a message and send it to a cloud computing system 140 for analysis. The cloud computing system 140 may be configured to analyze the message received by the user device 106 and determine a status of the message as safe, suspicious, or malicious. The message may comprise a uniform resource locator (URL) that points to a content (e.g., a file or a webpage), which may be safe, suspicious, or malicious. The cloud computing system 140 may determine the status of the message by comparing the URL with known safe and malicious URLs, comparing a source of the message to known safe and malicious sources, and/or analyzing the URL and the content identified by the URL for malicious content and/or spelling errors. After determining the status of the message, the cloud computing system 140 sends the status to the client application 120 of the user device 106. The client application 120 then releases the message to be displayed by the user device 106 along with this status. The cloud computing system 140 may receive feedback from the user and may update the known safe and malicious URLs and the known safe and malicious sources based on the feedback.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

User Device

User device 106 is generally any device that is configured to process data and interact with a user 104. Examples of the user device 106 include, but are not limited to, a personal computer, a desktop computer, a workstation, a server, a laptop, a tablet computer, a mobile phone (such as a smartphone), etc. The user device 106 may include a user interface, such as a display, a microphone, keypad, or other appropriate terminal equipment usable by the user 104.

The device 106 may comprise a processor 108 in signal communication with a memory 116 and a network interface 110. Processor 108 comprises one or more processors operably coupled to the memory 110. The processor 108 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The one or more processors are configured to process data and may be implemented in hardware or software. For example, the processor 108 may be 8-bit, 16-bit, 32-bit, 64-bit, or of any other suitable architecture. The one or more processors are configured to implement various software instructions to perform the operations described herein. For example, the one or more processors are configured to execute software instructions 118 and perform one or more functions described herein.

Network interface 110 is configured to enable wired and/or wireless communications (e.g., via network 102). The network interface 110 is configured to communicate data between the user device 106 and other components of the system 100. For example, the network interface 110 may comprise a WIFI interface, a local area network (LAN) interface, a wide area network (WAN) interface, a modem, a switch, or a router. The processor 108 is configured to send and receive data using the network interface 110. The network interface 110 may be configured to use any suitable type of communication protocol as would be appreciated by one of ordinary skill in the art.

Memory 116 may be volatile or non-volatile and may comprise a read-only memory (ROM), random-access memory (RAM), ternary content-addressable memory (TCAM), dynamic random-access memory (DRAM), and static random-access memory (SRAM). Memory 116 may be implemented using one or more disks, tape drives, solid-state drives, and/or the like. The memory 116 may store any of the information described in FIGS. 1, 2A, 2B, and 2C along with any other data, instructions, logic, rules, or code operable to implement the function(s) described herein when executed by the processor 108. The memory 116 is operable to store software instructions 118, and/or any other data and instructions. The software instructions 118 may comprise any suitable set of software instructions, logic, rules, or code operable to be executed by the processor 108.

The user device 106 may be configured to receive a message (e.g., message 128 or 132) or a quick response (QR) code (e.g., QR code 122). The message 126 may comprise a QR code 128, which may encode a URL 130. The message 132 may comprise a URL 134. The messages 126 and 132 may be text messages, short messaging service (SMS) messages, or the like. The user device 106 may receive the messages 126 and 132 from legitimate and/or malicious sources. The user device 106 may further comprise a display 112, which may be configured to display received messages. The QR code 122 may encode a URL 124. The user device 106 may comprise a camera 114, which may be configured to capture the QR code 122. The QR code 122 may be from legitimate and/or malicious sources.

The memory 116 may further store a client application 120 that are operable to implement the function(s) described herein when executed by the processor 108. In certain, embodiments, the processor 108, when executing the client application 120, is configured to intercept a message (e.g., message 128 or 132) or a QR code (e.g., QR code 122) that is received by the user device 106. The processor 108 is configured to send the message or the QR code to the cloud computing system 140. The processor 108 receives a status (e.g., status 138) of the message or the QR code from the cloud computing system 140, and releases the message or the QR code to be displayed along with the status. The user 104 may respond to the received message based on the status. The user 104 may ignore or delete the message if the status is identified as malicious. The user 104 may ignore or delete the message or follow the URL of the message if the status is identified as suspicious. The user 104 may follow the URL of the message if the status is identified as safe.

The processor 108 may be further configured to receive feedback 136 from the user 104 and send the feedback 136 to the cloud computing system 140. In one embodiment, the feedback 136 may comprise an information that a source that was previously identified as safe is actually malicious. In other embodiment, the feedback 136 may comprise an information that the source that was previously identified as suspicious is actually malicious. In yet other embodiment, the feedback 136 may comprise an information that the source that was previously identified as suspicious is actually safe.

In one embodiment, the feedback 136 may comprise an information that a URL that was previously identified as safe is actually malicious. In other embodiment, the feedback 136 may comprise an information that the URL that was previously identified as suspicious is actually malicious. In yet other embodiment, the feedback 136 may comprise an information that the URL that was previously identified as suspicious is actually safe.

External System

External system 178 is generally any device that is configured to process data and communicate with components of the system 100 via the network 102. The external system 178 may comprise a processor 180 in signal communication with a memory 184 and a network interface 182.

Processor 180 comprises one or more processors operably coupled to the memory 184. The processor 180 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 180 may be a programmable logic device, a microcontroller, a microprocessor, or any suitable combination of the preceding. The one or more processors are configured to process data and may be implemented in hardware or software. For example, the processor 180 may be 8-bit, 16-bit, 32-bit, 64-bit, or of any other suitable architecture. The one or more processors are configured to implement various software instructions to perform the operations described herein. For example, the one or more processors are configured to execute software instructions 186 and perform one or more functions described herein.

Network interface 182 is configured to enable wired and/or wireless communications (e.g., via network 102). The network interface 182 is configured to communicate data between the external system 178 and components of the system 100. For example, the network interface 182 may comprise a WIFI interface, a local area network (LAN) interface, a wide area network (WAN) interface, a modem, a switch, or a router. The processor 180 is configured to send and receive data using the network interface 182. The network interface 182 may be configured to use any suitable type of communication protocol as would be appreciated by one of ordinary skill in the art.

Memory 184 may be volatile or non-volatile and may comprise a read-only memory (ROM), random-access memory (RAM), ternary content-addressable memory (TCAM), dynamic random-access memory (DRAM), and static random-access memory (SRAM). Memory 184 may be implemented using one or more disks, tape drives, solid-state drives, and/or the like. The memory 184 is operable to store software instructions 186, and/or any other data and instructions. The software instructions 186 may comprise any suitable set of software instructions, logic, rules, or code operable to be executed by the processor 180.

The external system 178 may be configured to host files (e.g., file 172) and/or webpages (e.g., webpage 174). In such embodiments, the memory 184 may further store the files and/or the webpages. As described below in greater detail, the files and/or the webpages may be retrieved from the external system 178 by the cloud computing system 140 during operation.

Cloud Computing System

The cloud computing system 140 is generally any device that is configured to process data and communicate with other components of the system 100 via the network 102. The cloud computing system 140 may comprise a processor 142 in signal communication with a memory 146 and a network interface 144.

Processor 142 comprises one or more processors operably coupled to the memory 146. The processor 142 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 142 may be a programmable logic device, a microcontroller, a microprocessor, or any suitable combination of the preceding. The one or more processors are configured to process data and may be implemented in hardware or software. For example, the processor 142 may be 8-bit, 16-bit, 32-bit, 64-bit, or of any other suitable architecture. The one or more processors are configured to implement various software instructions to perform the operations described herein. For example, the one or more processors are configured to execute software instructions 148 and perform one or more functions described herein.

Network interface 144 is configured to enable wired and/or wireless communications (e.g., via network 102). The network interface 144 is configured to communicate data between the cloud computing system 140 and other components of the system 100. For example, the network interface 144 may comprise a WIFI interface, a local area network (LAN) interface, a wide area network (WAN) interface, a modem, a switch, or a router. The processor 142 is configured to send and receive data using the network interface 144. The network interface 144 may be configured to use any suitable type of communication protocol as would be appreciated by one of ordinary skill in the art.

Memory 146 may be volatile or non-volatile and may comprise a read-only memory (ROM), random-access memory (RAM), ternary content-addressable memory (TCAM), dynamic random-access memory (DRAM), and static random-access memory (SRAM). Memory 146 may be implemented using one or more disks, tape drives, solid-state drives, and/or the like. The memory 146 may store any of the information described in FIGS. 1, 2A, 2B, and 2C along with any other data, instructions, logic, rules, or code operable to implement the function(s) described herein. The memory 146 is operable to store software instructions 148, and/or any other data and 10 instructions. The software instructions 148 may comprise any suitable set of software instructions, logic, rules, or code operable to be executed by the processor 142.

Memory 146 may be operable to store a database 150. The database 150 may store various parameters that are used by the cloud computing system 140 to analyze received messages and QR codes. In certain embodiments, the memory 146 stores known safe sources 152, known malicious sources 154, known safe URLs 156, known malicious URLs 158, hashes 160 of known malicious files, and known malicious codes 162.

At operation, the cloud computing system 140 is configured to receive a message (e.g., message 128 or 132) or a QR code (e.g., QR code 122) from the user device 106. Subsequently, the cloud computing system 140 determines a source 164 of the message or the QR code. In case of the message, the cloud computing system 140 may determine the source 164 of the message based on a phone number from which the message was sent. In case of the QR code, the cloud computing system 140 may determine the source 164 of the QR code based on surroundings that are captured by the camera 114 while capturing the QR code. In other embodiments, geotagging information of an image comprising the QR code may be used to determine the source 164 of the QR code.

The cloud computing system 140 compares the source 164 to the known malicious sources 154. In response to determining the source 164 matches one of the known malicious sources 154, the cloud computing system 140 determines the status 138 of the message or the QR code as malicious. In response to determining that the source 164 does not match any of the known malicious sources 154, the cloud computing system 140 compares the source 164 to the known safe sources 152. In response to determining that the source 164 matches one of the known safe sources 152, the cloud computing system 140 determines the status 138 of the message or the QR code as safe. In response to determining that the source 164 does not match any of the known safe sources 152, the cloud computing system 140 compares a URL (e.g., URLs 124, 130 and 134) of the messages or the QR code to the known malicious URLs 158. In response to determining that the URL matches one of the known malicious URLs 158, the cloud computing system 140 determines the status 138 of the message of the QR code as malicious. In response to determining that the URL does not match any of the known malicious URLs 158, the cloud computing system 140 compares the URL to the known safe URLs 156. In response to determining that the URL matches one of the known safe URLs 156, the cloud computing system 140 determines the status 138 of the message or the QR code as safe.

In response to determining the URL does not match any of the known safe URLs 156, the cloud computing system 140 analyzes the URL for spelling errors 168. In response to identifying at least one spelling error, the cloud computing system 140 determines the status 138 of the message or the QR code as suspicious. In response to identifying no spelling error, the cloud computing system 140 determines a destination 170 that corresponds to the URL. In certain embodiments, the destination 170 may be a file 172 or a webpage 174 hosted by an external system 178. The file may be a text file, an image file, or the like.

In case when the cloud computing system 140 determines that the destination 170 is the file 172 hosted by the external system 178, the cloud computing system 140 retrieves the file 172 from the external system 178 and generates a hash 166 of the file 172. Subsequently, the cloud computing system 140 compares the hash 166 to the hashes 160 of known malicious files. In response to determining that the hash 166 matches one of the hashes 160, the cloud computing system 140 determines the status 138 of the message or the QR code as malicious.

In response to determining that the hash 166 does not match any of the hashes 160, the cloud computing system 140 analyzes the file 172 for spelling errors 168. In response to identifying at least one spelling error, the cloud computing system 140 determines the status 138 of the message or the QR code as suspicious. In response to identifying no spelling error, the cloud computing system 140 determines the status 138 of the message or the QR code as safe.

In case when the cloud computing system 140 determines that the destination 170 is the webpage 174 hosted by the external system 178, the cloud computing system 140 retrieves the webpage 174 from the external system 178 and analyzes a source code 176 of the webpage 174 for malicious codes 162. In response to identifying at least one malicious code, the cloud computing system 140 determines the status 138 of the message or the QR code as malicious.

In response to identifying no malicious code, the cloud computing system 140 analyzes contents of the webpage 174 for spelling errors. In response to identifying at least one spelling error, the cloud computing system 140 determines the status 138 of the message or the QR code as suspicious. In response to identifying no spelling error, the cloud computing system 140 determines the status 138 of the message or the QR code as safe.

In certain embodiments, the cloud computing system 140 may be further configured to receive feedback 136 from the user device 160 and update the known safe sources 152, the known malicious sources 154, the known safe URLs 156, the known malicious URLs 158, the hashes 160 of known malicious files, and the known malicious codes 162 based on the feedback 136.

In one embodiment, the feedback 136 may comprise an information that a source that was previously identified as safe is actually malicious. Such a source is then removed from the known safe source 152. In other embodiment, the feedback 136 may comprise an information that the source that was previously identified as suspicious is actually malicious. Such a source is then added to the known malicious sources 154. In yet other embodiment, the feedback 136 may comprise an information that the source that was previously identified as suspicious is actually safe. Such a source is then added to the known safe sources 152.

In one embodiment, the feedback 136 may comprise an information that a URL that was previously identified as safe is actually malicious. Such a URL is then removed from the known safe URLs 156. In other embodiment, the feedback 136 may comprise an information that the URL that was previously identified as suspicious is actually malicious. Such a URL is then added to the known malicious URLs 158. In yet other embodiment, the feedback 136 may comprise an information that the URL that was previously identified as suspicious is actually safe. Such a URL is then added to the known safe URLs 156.

Example Method for Identifying Security Threats of an Application

Figure 2A:
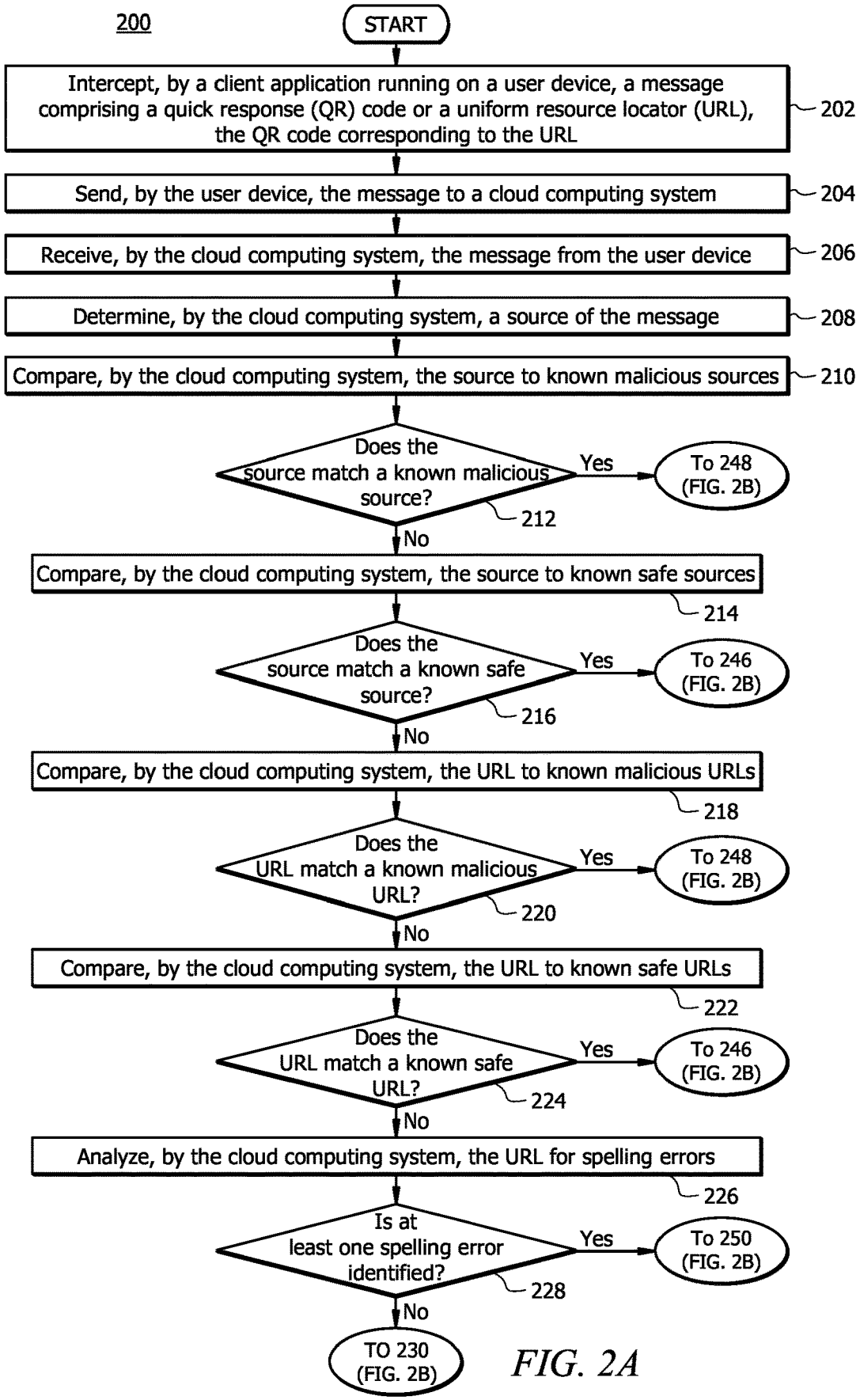
FIGS. 2A, 2B, and 2C illustrate an example operational flow of system of FIG. 1 for analyzing messages for malicious content.
Figure 2B:
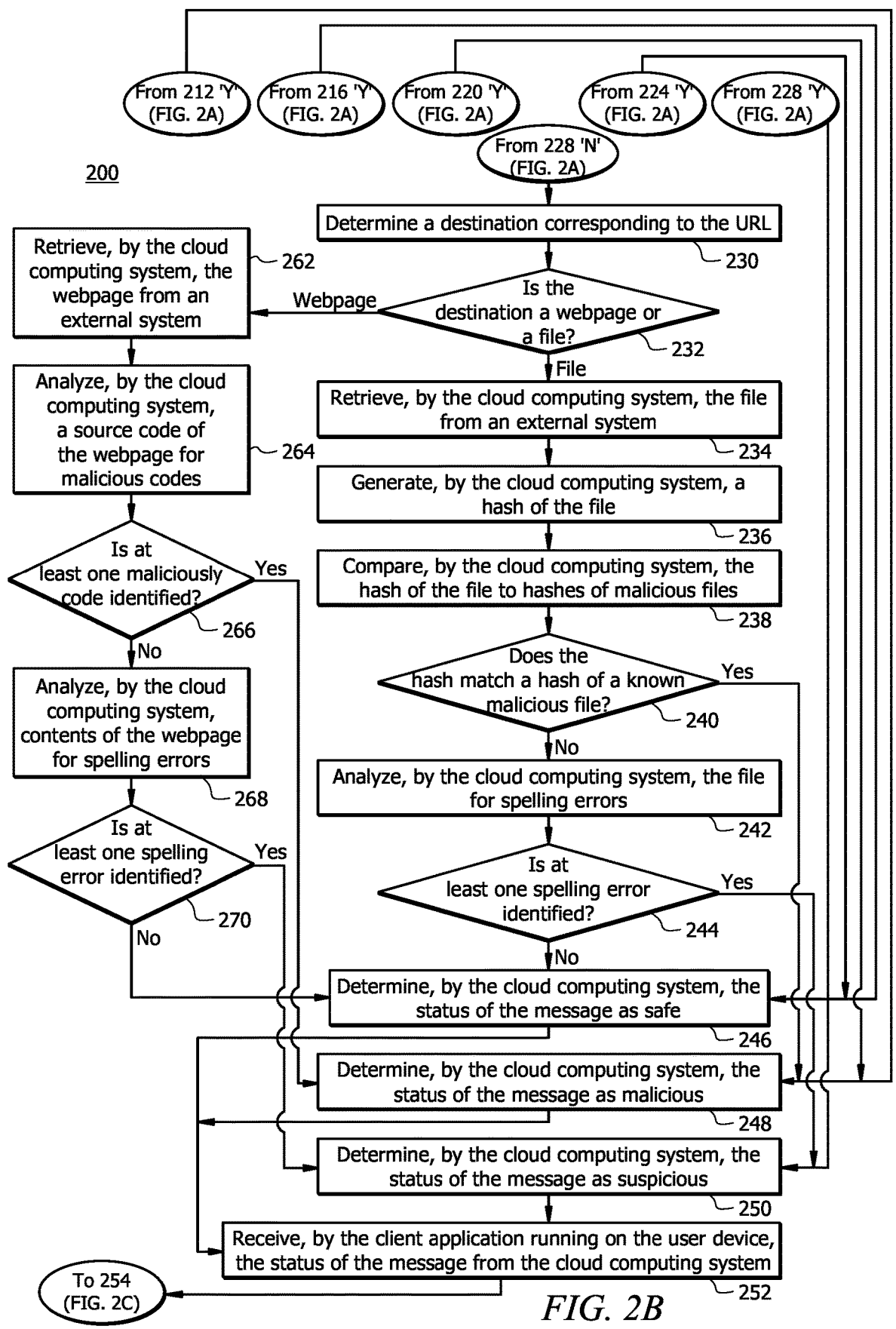
Figure 2C:
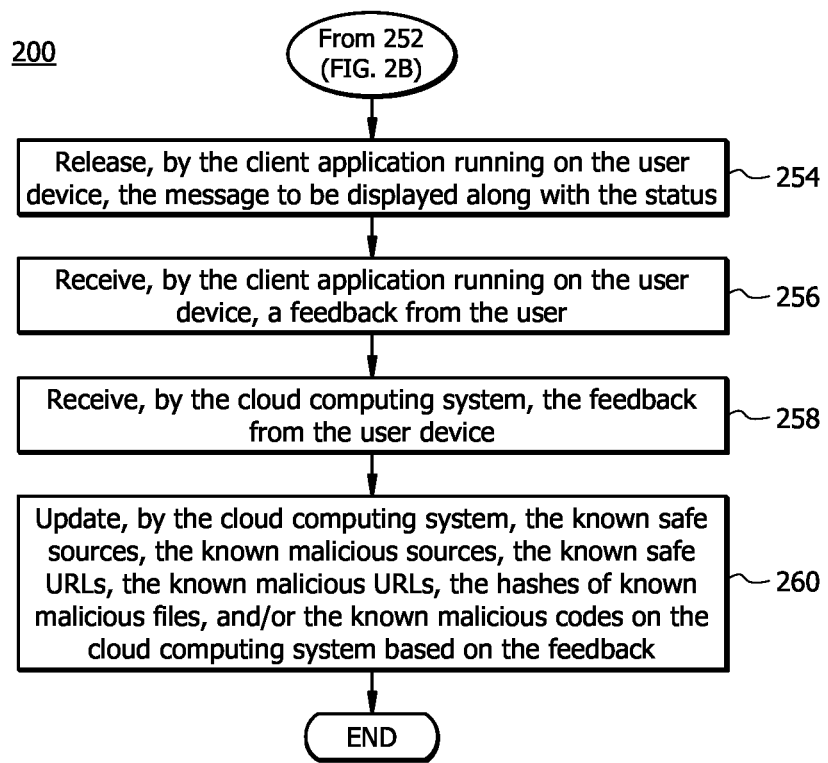

FIGS. 2A, 2B, and 2C illustrate an example flowchart of a method 200 for analyzing messages for malicious content using a cloud computing system. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., instructions 118, and/or 148 of FIG. 1), stored on non-transitory, tangible, machine-readable medium (e.g., memories 116, and/or 146 of FIG. 1) that when executed by one or more processors (e.g., processors 108, and/or 142 of FIG. 1) may cause the one or more processors to perform operations 202-270.

At operation 202, a client application (e.g., client application 120 of FIG. 1) running on a user device (e.g., user device 106 of FIG. 1) intercepts a message (e.g., messages 126 and 132 of FIG. 1) comprising a QR code (e.g., QR code 128 of FIG. 1) or a URL (e.g., URLs 130 and 134 of FIG. 1), such that the QR code corresponds to the URL.

At operation 204, the user device sends the message 132 to a cloud computing system (e.g., cloud computing system 140 of FIG. 1).

At operation 206, the cloud computing system 140 receives the message 132 from the user device 106.

At operation 208, the cloud computing system 140 determines a source (e.g., source 164 of FIG. 1) of the message 132.

At operation 210, the cloud computing system 140 compares the source 164 to known malicious sources (e.g., known malicious sources 154 of FIG. 1).

At operation 212, the cloud computing system 140 determines if the source 164 matches a known malicious source 154.

In response to the source 164 matching the known malicious source 154, method 200 continues to operation 248, where the cloud computing system 140 determines a status (e.g., status 138 of FIG. 1) of the message 132 as malicious.

In response to the source 164 not matching the known malicious 154 source as determined at operation 212, method 200 continues to operation 214, where the cloud computing system 140 compares the source 164 to known safe sources (e.g., known safe sources 152 of FIG. 1).

At operation 216, the cloud computing system 140 determines if the source 164 matches a known safe source 152.

In response to the source 164 matching the known safe source 152, method 200 continues to operation 246, where the cloud computing system 140 determines the status 138 of the message 132 as safe.

In response to the source 164 not matching the known safe source 152 as determined at operation 216, method 200 continues to operation 218, where the cloud computing system 140 compares the URL 134 to known malicious URLs (e.g., known malicious URLs 158 of FIG. 1).

At operation 220, the cloud computing system 140 determines if the URL 134 matches a known malicious URL 158.

In response to the URL 134 matching the known malicious URL 158, method 200 continues to operation 248, where the cloud computing system 140 determines the status 138 of the message 132 as malicious.

In response to the URL 134 not matching the known malicious URL 158 as determined at operation 220, method 200 continues to operation 222, where the cloud computing system 140 compares the URL 134 to known safe URLs (e.g., known safe URLs 156 of FIG. 1).

At operation 224, the cloud computing system 140 determines if URL 134 matches a known safe URL 156.

In response to the URL 134 matching the known safe URL 156, method 200 continues to operation 246, where the cloud computing system 140 determines the status 138 of the message 132 as safe.

In response to the URL 134 not matching the known safe URL 156 as determined at operation 224, method 200 continues to operation 226, where the cloud computing system 140 analyzes the URL 134 for spelling errors (e.g., spelling errors 168 of FIG. 1).

At operation 228, the cloud computing system 140 determines if at least one spelling error 168 is identified.

In response to identifying at least one spelling error 168 as determined at operation 228, method 200 continues to operation 250, where the cloud computing system 140 determines the status 138 of the message 132 as suspicious.

In response to identifying no spelling error as determined at operation 228, method 200 continues to operation 230, where the cloud computing system 140 determines a destination (e.g., destination 170 of FIG. 1) corresponding to the URL 134.

At operation 232, the cloud computing system 140 determines if the destination 170 is a file (e.g., file 172 of FIG. 1) or a webpage (e.g., webpage 174 of FIG. 1).

In response to determining that the destination 170 is the file 172 hosted by an external system (e.g., external system 178 of FIG. 1), method 200 continues to operation 234, where the cloud computing system 140 retrieves the file 172 from the external system 178.

At operation 236, the cloud computing system 140 generates a hash (e.g., hash 166 of FIG. 1) of the file 172.

At operation 238, the cloud computing system 140 compares the hash to hashes (e.g., hash 160 of FIG. 1) of malicious files.

At operation 240, the cloud computing system 140 determines if the hash 166 matches a hash 160 of a known malicious file.

In response to determining that the hash 166 matches the hash 160 of the known malicious file as determined at operation 240, method 200 continues to operation 248, where the cloud computing system 140 determines the status 138 of the message 132 as malicious.

In response to determining that the hash 166 does not match the hash 160 of the known malicious file as determined at operation 240, method 200 continues to operation 242, where the cloud computing system 140 analyzes the file 172 for spelling errors 168.

At operation 244, the cloud computing system 140 determines if at least one spelling error 168 is identified.

In response to identifying at least one spelling error 168 as determined at operation 244, method 200 continues to operation 250, where the cloud computing system 140 determines the status 138 of the message 132 as suspicious.

In response to identifying no spelling error as determined at operation 244, method 200 continues to operation 246, where the cloud computing system 140 determines the status 138 of the message 132 as safe.

In response to determining at operation 232 that the destination 170 is the webpage 174 hosted by the external system 178, method 200 continues to operation 262, where the cloud computing system 140 retrieves the webpage 174 from the external system 178.

At operation 264, the cloud computing system 140 analyzes a source code (e.g., source code 176 of FIG. 1) of the webpage 174 for malicious codes (e.g., malicious codes 162 of FIG. 1).

At operation 266, the cloud computing system 140 determines if at least one malicious code 162 is identified.

In response to identifying at least one malicious code 162 as determined at operation 266, the method 200 continues to operation 248, where the cloud computing system 140 determines the status 138 of the message 132 as malicious.

In response to identifying no malicious code as determined at operation 266, the method 200 continues to operation 268, where the cloud computing system 140 analyzes contents of the webpage 174 for spelling errors 168.

At operation 270, the cloud computing system 140 determines if at least one spelling error 168 is identified.

In response to identifying at least one spelling error 168 as determined at operation 270, method 200 continues to operation 250, where the cloud computing system 140 determines the status 138 of the message 132 as suspicious.

In response to identifying no spelling error as determined at operation 270, method 200 continues to operation 246, where the cloud computing system 140 determines the status 138 of the message 132 as safe.

After determining the status 138 of the message 132, method 200 continues to operation 252, wherein the client application 120 running on the user device 106 receives the status 138 of the message 132 from the cloud computing system 140.

At operation 254, the client application 120 running on the user device 106 releases the message 132 to be displayed along with the status 138. In certain embodiments, the message 132 along with the status 138 is displayed by a display (e.g., display 112 of FIG. 1) of the user device 106.

At operation 256, the client application 120 running on the user device 106 receives feedback (e.g., feedback 136 of FIG. 1) from the user 104.

At operation 258, the cloud computing system 140 receives the feedback 136 from the user device 106.

At operation 260, the cloud computing system 140 updates the known safe sources 152, the known malicious sources 154, the known safe URLs 156, the known malicious URLs 158, the hashes 160 of known malicious files, and/or the known malicious codes 160 based on the feedback 136.

In one embodiment, the feedback 136 may comprise an information that a source that was previously identified as safe is actually malicious. Such a source is then removed from the known safe sources 152. In other embodiment, the feedback 136 may comprise an information that a source that was previously identified as suspicious is actually malicious. Such a source is then added to the known malicious sources 154. In yet other embodiment, the feedback 136 may comprise an information that the source that was previously identified as suspicious is actually safe. Such a source is then added to the known safe sources 152.

In one embodiment, the feedback 136 may comprise an information that a URL that was previously identified as safe is actually malicious. Such a URL is then removed from the known safe URLs 156. In other embodiment, the feedback 136 may comprise an information that the URL that was previously identified as suspicious is actually malicious. Such a URL is then added to the known malicious URLs 158. In yet other embodiment, the feedback 136 may comprise an information that the URL that was previously identified as suspicious is actually safe. Such a URL is then added to the known safe URLs 156.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a user device comprising:
   a first memory configured to store a client application; and
   a first processor communicatively coupled to the first memory, wherein the first processor, when executing the client application, is configured to:
   intercept a message comprising a quick response (QR) code or a uniform resource locator (URL), wherein the QR code corresponds to the URL;
   send the message to a cloud computing system;
   receive a status of the message from the cloud computing system; and
   release the message to be displayed along with the status; and
   the cloud computing system communicatively coupled to the user device, wherein the cloud computing system comprises:
   a second memory configured to store:
   known safe URLs;
   known malicious URLs;
   known safe sources;
   known malicious sources;
   known malicious codes; and
   hashes of known malicious files; and
   a second processor communicatively coupled to the second memory, the second processor configured to:
   receive the message from the user device;
   determine the status of the message, wherein determining the status of the message comprises:
   determining a source of the message;
   comparing the source of the message to the known malicious sources;
   in response to the source of the message not matching any of the known malicious sources, comparing the source of the message to the known safe sources;
   in response to the source of the message not matching any of the known safe sources, comparing the URL to the known malicious URLs; and in response to the URL matching a respective one of the known malicious URLs, determining the status of the message as malicious;
in response to the URL not matching any of the known malicious URLs, compare the URL to the known safe URLs;
in response to the URL matching a respective one of the known safe URLs, determine the status of the message as safe;
in response to the URL not matching any of the known safe URLs, analyze the URL for spelling errors;
in response to identifying at least one spelling error in the URL, determine the status of the message as suspicious;
in response to identifying no spelling errors in the URL, determine a destination identified by the URL;
in response to determining that the destination identified by the URL is a file, determine a hash of the file;
compare the hash of the file to the hashes of known malicious files; and
in response to the hash of the file matching a hash of one of the known malicious files, determine the status of the message as malicious; and
send the status of the message to the user device.

2. The system of claim 1, wherein determining the status of the message further comprises:
in response to the hash of the file not matching any of the hashes of known malicious files, analyzing contents of the file for spelling errors;
in response to identifying at least one spelling error in the file, determining the status of the message as suspicious; and
in response to identifying no spelling errors in the file, determining the status of the message as safe.

3. The system of claim 2, wherein determining the status of the message further comprises:
in response to determining that the destination identified by the URL is a webpage, analyzing a source code of the webpage for malicious codes; and
in response to identifying at least one malicious code, determining the status of the message as malicious.

4. The system of claim 3, wherein determining the status of the message further comprises:
in response to identifying no malicious code, analyzing contents of the webpage for spelling errors;
in response to identifying at least one spelling error in the webpage, determining the status of the message as suspicious; and
in response to identifying no spelling errors in the webpage, determine the status of the message as safe.

5. A method comprising:
intercepting a message comprising a quick response (QR) code or a uniform resource locator (URL), wherein the QR code corresponds to the URL;
determining a status of the message, wherein determining the status of the message comprises:
determining a source of the message;
comparing the source of the message to known malicious sources;
in response to the source of the message not matching any of the known malicious sources, comparing the source of the message to known safe sources;
in response to the source of the message not matching any of the known safe sources, comparing the URL to known malicious URLs; and
in response to the URL matching a respective one of the known malicious URLs, determining the status of the message as malicious;
in response to the URL not matching any of the known malicious URLs, comparing the URL to known safe URLs;
in response to the URL matching a respective one of the known safe URLs, determining the status of the message as safe;
in response to the URL not matching any of the known safe URLs, analyzing the URL for spelling errors;
in response to identifying at least one spelling error in the URL, determining the status of the message as suspicious;
in response to identifying no spelling errors in the URL, determining a destination identified by the URL;
in response to determining that the destination identified by the URL is a file, determining a hash of the file;
comparing the hash of the file to hashes of known malicious files; and
in response to the hash of the file matching a hash of one of the known malicious files, determining the status of the message as malicious; and
releasing the message to be displayed along with the status.

6. The method of claim 5, further comprising:
in response to the hash of the file not matching any of the hashes of known malicious files, analyzing contents of the file for spelling errors;
in response to identifying at least one spelling error in the file, determining the status of the message as suspicious; and
in response to identifying no spelling errors in the file, determining the status of the message as safe.

7. The method of claim 6, further comprising:
in response to determining that the destination identified by the URL is a webpage, analyzing a source code of the webpage for malicious codes; and
in response to identifying at least one malicious code, determining the status of the message as malicious.

8. The method of claim 7, further comprising:
in response to identifying no malicious code, analyzing contents of the webpage for spelling errors;
in response to identifying at least one spelling error in the webpage, determining the status of the message as suspicious; and
in response to identifying no spelling errors in the webpage, determine the status of the message as safe.

9. A non-transitory computer-readable medium storing instructions that, when executed by one or more processors, cause the one or more processors to:
intercept a message comprising a quick response (QR) code or a uniform resource locator (URL), wherein the QR code corresponds to the URL;
determine a status of the message, wherein determining the status of the message comprises:
determining a source of the message;
comparing the source of the message to known malicious sources;
in response to the source of the message not matching any of the known malicious sources, comparing the source of the message to known safe sources;

in response to the source of the message not matching any of the known safe sources, comparing the URL to known malicious URLs; and in response to the URL matching a respective one of the known malicious URLs, determining the status of the message as malicious;

in response to the URL not matching any of the known malicious URLs, compare the URL to known safe URLs;

in response to the URL matching a respective one of the known safe URLs, determine the status of the message as safe;

in response to the URL not matching any of the known safe URLs, analyze the URL for spelling errors; and in response to identifying at least one spelling error in the URL, determine the status of the message as suspicious;

in response to identifying no spelling errors in the URL, determine a destination identified by the URL;

in response to determining that the destination identified by the URL is a file, determine a hash of the file;

compare the hash of the file to hashes of known malicious files; and in response to the hash of the file matching a hash of one of the known malicious files, determine the status of the message as malicious; and release the message to be displayed along with the status.

10. The non-transitory computer-readable medium of claim 9, wherein the instructions, when executed by the one or more processors, further cause the one or more processors to:

in response to the hash of the file not matching any of the hashes of known malicious files, analyze contents of the file for spelling errors;

in response to identifying at least one spelling error in the file, determine the status of the message as suspicious; and in response to identifying no spelling errors in the file, determine the status of the message as safe.

11. The non-transitory computer-readable medium of claim 10, wherein the instructions, when executed by the one or more processors, further cause the one or more processors to:

in response to determining that the destination identified by the URL is a webpage, analyze a source code of the webpage for malicious codes; and in response to identifying at least one malicious code, determine the status of the message as malicious.

* * * * *